No. 779,766. PATENTED JAN. 10, 1905.
C. D. CAMPBELL.
NUT LOCK.
APPLICATION FILED OCT. 9, 1903.
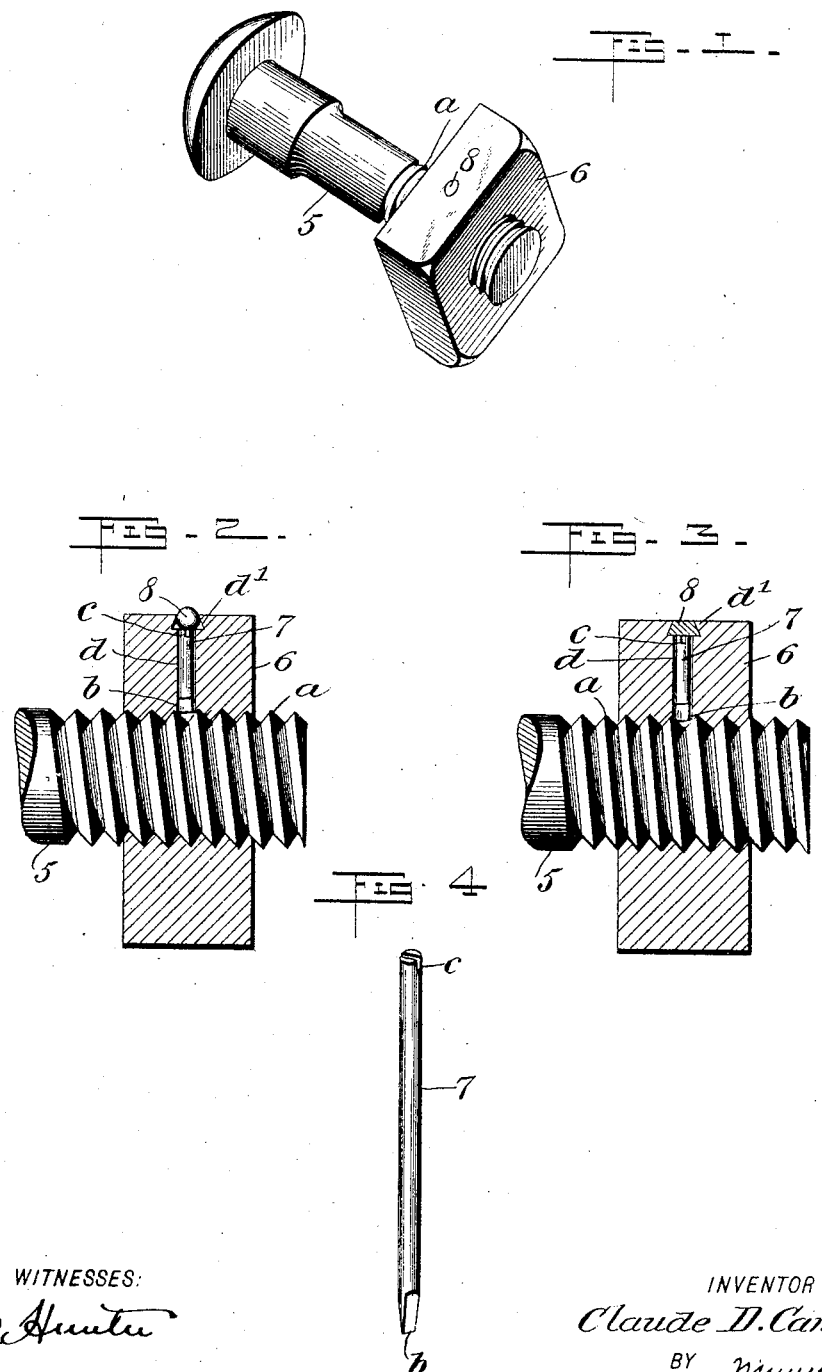

No. 779,766.  
Patented January 10, 1905.

UNITED STATES PATENT OFFICE.

CLAUDE DAVID CAMPBELL, OF MARR, OHIO.

NUT-LOCK.

SPECIFICATION forming part of Letters Patent No. 779,766, dated January 10, 1905.

Application filed October 9, 1903. Serial No. 176,376.

*To all whom it may concern:*

Be it known that I, CLAUDE DAVID CAMPBELL, a citizen of the United States, and a resident of Marr, in the county of Monroe and State of Ohio, have invented a new and Improved Nut-Lock, of which the following is a full, clear, and exact description.

The object of this invention is to provide a nut-lock of novel construction which may be applied upon any nut to hold it stationary at a desired point on a screw-threaded bolt, avoid injuring the nut or bolt, be adapted for release, if this is desired, and be extremely simple, durable, and inexpensive.

This invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of a bolt and a nut secured thereon by application of the improvement. Fig. 2 is a transverse sectional view of a nut, a portion of a screw-threaded bolt whereon the nut is screwed, and a side view of the improved nut-lock applied to the nut and bolt, the means for holding the nut-lock in place being incomplete. Fig. 3 is a similar view to Fig. 2, but showing the nut-lock held in the nut and engaging the thread of the bolt; and Fig. 4 is a detached perspective view of the improved nut-lock.

In illustrating the application of the improved nut-lock 5 indicates a screw-threaded bolt, which may be of any form or size, having a screw-cut thread $a$ extending from one end of the bolt-body.

6 represents a nut screwed upon the thread $a$, and it is to be understood that said nut of quadrangular form may have any preferred shape and dimensions that will best adapt it for effective service.

The nut-lock 7 consists of a preferably cylindrical rod that may with advantage be formed of steel, the body of the rod having a suitable length and diameter that correspond with the dimensions of the bolt and nut with which the locking device is to have engagement. One end of the body 7 is tapered to give it chisel form, as shown in Fig. 4 at $b$, and at the opposite end a kerf $c$ is formed transversely therein.

To adapt the nut—such, for example, as the nut 6—to receive the nut-lock body 7, the nut is perforated through one side to intersect the threaded bore of the nut at a right angle to its axis, as shown at $d$ in Figs. 2 and 3. The outer end of the perforation $d$ is counterbored to enlarge it for a short distance from the exterior surface of the side of the nut wherein the perforation is made, and, as indicated in Figs. 2 and 3, this counterbore $d'$ is widened toward the bottom thereof by undercutting the side wall.

In applying the device for the secure retention of the nut 6 at a desired point on the bolt 5 a screw-driver is inserted into the kerf $c$ after the nut-lock body 7 has been fully inserted within the perforation $d$, and the implement is manipulated to dispose the chisel edge of the inner end of the rod 7 across the thread of the bolt 5, as represented in Figs. 2 and 3.

The upper end of the nut-lock body is positioned nearly level with the bottom of the undercut counterbore $d'$ when the edge $b$ rests loosely on the thread of the bolt 5. A slug 8, of lead or other soft metal, is placed in the counterbore $d'$ and may project somewhat above the surface of the nut, the dimensions of said slug, which may be spherical or have any other suitable shape, being such that it nearly fills the cavity in which it is placed. The slug 8 is now struck with a hammer, so as to flatten it and cause the soft metal to spread and fill the counterbore $d'$, as shown in Fig. 3. The force of the blows given the slug 8 will cause the edge $b$ of the nut-locking device to be slightly bedded in the material of the thread $a$, and thus adapt the edge portion of the nut-lock body 7 to prevent the nut from turning in either direction on the bolt.

It will be seen that there are no projections on the nut, and the bolt-thread is not injured by the slight embedment of the nut-lock in the same. When the nut is to be removed or otherwise altered in adjustment on the bolt, the soft-metal filling 8 must be removed by any suitable implement and the screw-driver applied to engage the kerf c and give the end b a partial revolution, so as to release the corners of the chisel-shaped end of the nut-lock from embedment in the thread of the bolt, whereupon the nut-lock body will fall out of the nut when the nut is turned so as to dispose the nut-lock with the kerfed end lowermost and the nut is struck a blow with a hammer.

It will be seen that the improved nut-lock is extremely simple, can be produced from wire-rod material at a low cost, is durable, may be reused many times, and is reliable in service, being adapted for general application to all forms and sizes of nuts that need locking.

Having thus described my invention, I claim as new and desire to secure by Letters Patent—

1. The combination with a threaded bolt, and a nut screwed thereon, said nut having a perforation extending through one side into the threaded bore thereof, of a metal pin having a transverse kerf at one end, and chisel-shaped at the other end, said pin fitting in the perforation of the nut with its outer end terminating short of the outer end of said perforation and its chisel-shaped end seating transversely on the apices of the bolt-threads, and a soft-metal slug for closing the perforation at its outer end, said slug being adapted to be compressed by percussion into said opening, whereby the chisel-shaped end of the pin is embedded in the bolt-thread to hold the nut from turning thereon.

2. The combination with a threaded bolt, and a nut screwed thereon, said nut having a perforation extending through one side into the threaded bore thereof, the perforation being enlarged at its outer end and having the side walls thereof undercut, of a metal pin fitting in the perforation of the nut and being of a length a little greater than that of the smaller inner portion of the perforation, said pin having a transverse kerf in one end and a chisel-shaped opposite end seated transversely upon the apices of threads of the bolt by means engaged with the kerf thereof, and a soft-metal slug that is compressed by percussion and fills the enlarged end of the perforation in the nut, the compression of the slug causing the chisel end of the pin to be slightly embedded in the thread of the bolt and thus hold the nut from turning.

In testimony whereof I have signed my name to this specification in the presence of two subscribing witnesses.

CLAUDE DAVID CAMPBELL.

Witnesses:
  BERTHA McPECK,
  L. B. MARTIN.